United States Patent Office 3,345,388
Patented Oct. 3, 1967

3,345,388
FATTY ACID-POLYOL PARTIAL ESTERS REACTED WITH BIS(ISOCYANATOALKYL) FUMARATES
Charles L. Milligan, South Charleston, and Kenneth L. Hoy, St. Albans, W. Va., assignors to Union Carbide Corporation, a corporation of New York
No Drawing. Filed Nov. 25, 1964, Ser. No. 413,950
3 Claims. (Cl. 260—404.5)

ABSTRACT OF THE DISCLOSURE

There is disclosed coating compositions prepared by reacting a bis(isocyanatoethyl) fumarate with the partial ester of a drying oil acid and a polyol having at least three hydroxyl groups.

---

The invention relates to coating compositions. In one aspect, the invention relates to certain oil modified urethane coatings compositions.

Heretofore it has been known that useful coating compositions could be prepared from arylene diisocyanate modified drying oils. For example, the Hauge et al. patent (U.S. No. 2,970,062) discloses coating compositions that are produced by reacting an arylene diisocyanate (for instance, tolylene diisocyanate) with glycerol or higher polyol that has been partially esterified with a drying oil acid. The resulting polymer is essentially a substantially linear polyurethane chain having pendant drying oil acid groups. The coatings produced therefrom are hard, abrasion resistant, chemically resistant, and have excellent adhesion to the substrate. Such coatings are, however, characterized by one major deficiency, namely, poor color stability after exposure to light. This deficiency is caused principally by the presence of the arylene diisocyanate residues. In order to improve the light stability of such coating compositions, it was postulated that this improvement could be effected by substituting an aliphatic diisocyanate for the arylene diisocyanate in the formulation. It was found, however, that the use of aliphatic diisocyanates such as hexamethylene diisocyanate in the above-described coating compositions resulted in a coating that had substantially reduced hardness, although the light stability showed the expected improvement. Thus, the substitution of an aliphatic diisocyanate for an arylene diisocyanate resulted in the improvement of one property at the expense of another.

In accordance with the present invention, it has been discovered that valuable oil modified polyurethane coating compositions can be produced from a bis(2-isocyanatoethyl) fumarate, and that these coating compositions exhibit excellent color stability upon exposure to light, and in addition, the coatings produced therefrom are often significantly harder than oil modified polyurethane coatings derived from other aliphatic diisocyanates heretofore tested, and in some cases have even better retention of properties upon exposure to light than the coatings based upon other aliphatic isocyanates.

The diisocyanates employed in the invention are bis(2-isocyanatoethyl) fumarate, bis(1-methyl-2-isocyanatoethyl) fumarate or 1-methyl-2-isocyanatoethyl 2-isocyanatoethyl fumarate. These isocyanates can be produced by phosgenation of a hydrochloride salt of a bis(2-aminoethyl) fumarate. The bis(2-aminoethyl) fumarate can be produced by reacting monoethanolamine, monoisopropanolamine, or mixtures thereof with maleic anhydride in a molar ratio of 2 moles of monoalkanolamine per mole of maleic anhydride. This reaction is carried out in a conventional reaction vessel at, for instance, 75° C. to 80° C. in an inert diluent such as ethylene dichloride, while continuously sparging phosgene through the reaction mixture in order to block the amine function of the monoalkanolamine to insure that the reaction that occurs will be exclusively between the alcohol group of the monoalkanolamine and the carboxylic acid functions of the maleic anhydride. At the completion of the reaction, which can take up to 10 hours or more, the bis(2-aminoethyl) fumarate is recovered as the dihydrochloride salt thereof. The phosgenation reaction to produce the diisocyanate is by conventional procedures. For instance, the bis(2-aminoethyl) fumarate dihydrochloride can be reacted with phosgene at elevated temperatures of, e.g., 150° C. or more, in a suitable solvent such as o-dichlorobenzene. The diisocyanate product is recovered from this reaction in customary manners. Extensive analysis indicates that the product of the above-described reactions is the fumarate rather than the maleate isomer.

The second reactant employed in the invention is a partial ester of a polyhydric alcohol, with the acidic moieties being drying or semi-drying oil fatty acids. As is well known in the art, the acids that are found in the naturally occurring drying and semi-drying oils include caprylic, capric, lauric, myristic, palmitic, stearic, oleic, linoleic, linolenic, ricinoleic, $\Delta^{9,10}$-decylenic, $\Delta^{9,10}$-dodecalynic, palmitoleic, petroselinic, vaccenic, eleostearic, licanic, parinaric, tariric, gadoleic, arachadonic, cetoleic, erucic, selacholeic, and the like. Thus, the acids of the naturally occurring drying and semi-drying oils contain from 8 to 24 carbon atoms, and contain sufficient unsaturation for the oil to be rated as at least semi-drying, that is, having an iodine number of at least 100, and preferably, at least 135. The partial ester employed in the invention is a partial ester of a polyhydric alcohol and drying or semi-drying oil acid. The polyhydric alcohols contemplated are those that have at least 3 hydroxyl groups such as glycerol, 1,2,6 - hexanetriol, pentaerythritol, 1,1,1 - trimethylolethane, 1,1,1-trimethylolpropane, 2,2,6,6-tetramethylolcyclohexanol, sorbitol, arabitol, alphamethylglucoside, 4,8,9-trihydroxytricyclo[4.3.1$^{2,5}$.0$^{1,6}$]decane, and the like. The preferred polyhydric alcohols are aliphatic alcohols that have from 3 to 6 hydroxyl groups, inclusive, and from 3 to 10 carbon atoms, and are composed entirely of carbon, hydrogen and oxygen. More preferred are the trihydroxyalkanes, and glycerine is most preferred. The word "aliphatic" includes both open chain and cyclic compositions that do not have aromatic unsaturation.

The partial ester of the polyhydric alcohol can be produced by a direct esterification reaction between the polyol and the appropriate quantity of acid, or a more economical method is to effect an ester interchange reaction between a drying or semi-drying oil and the polyhydric alcohol. Both of these procedures are well known in the art. The drying oils contemplated include linseed oil, dehydrated caster oil, tung oil, and the like.

The proportion of free hydroxyl groups in the partial ester is preferably controlled within rather narrow limits. For instance, it is generally desirable that the partial ester have a hydroxyl group functionality (i.e., average number of alcoholic hydroxyl groups per molecule of partial ester) of greater than 1, for instance from about 1.50, and lower, to about 1.95, and higher. In a preferred embodiment, the partial ester has a hydroxyl functionality of from about 1.60 to about 1.90. For instance, in order to produce a partial ester having an average of 1.85 alcoholic hydroxyl groups per molecule, 1 mole of an oil (which is a triglyceride) would be reacted with 1.61 moles of glycerine in the ester exchange reaction referred to above. Thus, the 3 equivalents of acid from the starting triglyceride would be distributed over 2.61 moles of glycerine in the product (3/2.61 is equal to 1.15 equivalents of acid moiety per glycerine, leaving 1.85 free alcoholic hydroxyl groups).

In the production of the coating compositions of the invention, the bis(2-isocyanatoethyl) fumarate is reacted with the partial ester described above. In carrying out this reaction, either reactant can be slowly added to the other at a temperature of, for instance, 60° C. to 100° C. The time for the addition is not critical, and it can vary over a wide range depending upon the capacity of the reaction equipment relative to the amount of reactants employed. Addition times of, for instance, 10 minutes to 45 minutes are typical. A subsequent reaction period of up to, for instance, 10 hours can be employed in order to insure essentially complete reaction of the diisocyanate. The reactants are preferably employed in proportions such that there is about 1 equivalent of alcoholic hydroxyl per equivalent of isocyanato, a very slight excess (e.g., up to 5 mole percent) of alcohol is desirable in some cases. An inert diluent can be employed, if desired. Materials such as mineral spirits, xylene, toluene, V.M. & P. naphtha, mixtures thereof, and the like, can be employed as the diluent. It is, of course, highly preferred to blanket the reaction mixture under an inert atmosphere such as nitrogen in order to prevent premature oxidation of the drying oil. At the completion of the reaction, the product can be dissolved in conventional varnish thinners such as the solvents mentioned above, and metallic driers containing, e.g., cobalt, manganese, or lead can be added in conventional amounts.

The coating compositions of the invention can be applied by customary techniques such as brushing, spraying, dip coating, and the like. Conventional air drying techniques can be employed. The coating compositions of the invention are highly useful for coating wood, metal, cloth, and the like.

The examples which follow illustrate various aspects of the invention.

EXAMPLE 1

*Alcoholysis*

Glycerol, 130 grams (4.23 eq.), linseed oil, 809 grams (2.77 eq.) and calcium naphthenate, 3.24 grams were mixed and heated to 225° C. for three hours. The alcoholysis product was cooled and analyzed for hydroxyl content using phthalic anhydride in pyridine reagent. The hydroxyl content was found to be 7.28 percent by weight. The alcoholysis product had the following physical properties:

Gardner color _____ 5.
Gardner viscosity _____ E.
OH functionality _____ 1.82 OH groups/molecule.

A. REACTION WITH TOLYLENE DIISOCYANATE

To 200 grams (0.856 OH eq.) of the stirred alcoholysis product was added dropwise 73 grams (0.842 eq.) of tolylene diisocyanate. The addition required thirty minutes during which time the temperature was held between 60–70° C. After completion of the tolylene diisocyanate addition the reaction solution was heated to 75–80° C. for an additional eight hours. An analysis for NCO content indicated that the reaction was complete. The product was diluted with mineral spirits and evaluated as follows.

Total solids _____ 45.0% (mineral spirits-xylene) 91%–9%.
Gardner color _____ 4–5.
Gardner viscosity _____ A–1.
Gardner impact (front) _____ >320 in. lbs.
Sward hardness (15-day) _____ 30.
Drying times:
  Tack free _____ 32 minutes.
  Cotton free _____ 52 minutes.
  Paper free _____ 77 minutes.

B. REACTION WITH BIS(2-ISOCYANATOETHYL) FUMARATE (FDI)

To 200 grams (0.856 OH eq.) of the stirred alcoholysis product was added dropwise 107 grams (0.842 eq.) of FDI. The addition required forty minutes during which time the temperature was held between 60–70° C. After the completion of the isocyanate addition the reaction solution was heated to 90–95° C. for an additional eight hours. An analysis for NCO content indicated that the reaction was complete. The product was diluted with mineral spirits-xylene and evaluated as follows.

Total solids _____ 45% in (mineral spirits-xylene) (91%–9%).
Gardner color _____ 2–3.
Gardner viscosity _____ N.
Gardner impact (front) _____ >320 in. lbs.
Sward hardness (15-day) _____ 12.
Drying times:
  Tack free _____ 33 minutes.
  Cotton free _____ 78 minutes.
  Paper free _____ 178 minutes.

C. REACTION WITH HEXAMETHYLENEDIISOCYANATE-1,6

To 200 grams (0.856 OH eq.) of the stirred alcoholysis product was added dropwise 71 grams (0.842 eq.) of hexamethylenediisocyanate. The addition required twenty-five minutes during which time the temperature was held between 60–70° C. after the completion of the addition the reaction solution was heated to 90–95° C. for an additional eight hours. An analysis for NCO content indicated that the reaction was complete. The product was diluted with mineral spirits-xylene and evaluated as follows.

Total solids _____ 45% in (mineral spirits-xylene) (91%–9%).
Gardner color _____ 4.
Gardner viscosity _____ F.
Gardner impact (front) _____ >320 in. lbs.
Sward hardness (15-day) _____ 2.
Drying times:
  Tack free _____ 39 minutes.
  Cotton free _____ 109 minutes.
  Paper free _____ 354 minutes.

In the above-described experiments, the coating was applied to a steel substrate. The resulting coatings were all about 1.5–1.8 mils in thickness. The driers employed contained .02 percent cobalt, .02 percent manganese, and 0.1 percent lead, the percentages being based upon weight of non-volatiles.

The coating based upon tolylene diisocyanate turned strongly yellow upon exposure to light in the Weatherometer for 1500 hours, which is a distinct disadvantage in many applications. By replacing the tolylene diisocyanate with hexamethylene diisocyanate, the yellowing problem is somewhat reduced (only slight yellowing in the Weatherometer) but the Sward hardness is reduced from 30 to 2 and 660 hours' exposure in the Weatherometer caused blistering. However, when a coating is made in accordance with the invention (Example 1–B), not only is the yellowing problem alleviated (no change in color or film appearance after 1800 hours exposure in the Weatherometer), but also the Sward hardness is significantly higher than when hexamethylene diisocyanate is employed.

EXAMPLE 2

A partial ester was produced by esterifying 2.88 equivalents (based on hydroxyl content) of 4,8,9-trihydroxytricyclo[4.3.1$^{2,5}$.0$^{1,6}$]decane with 1.28 equivalents of soya acids. The resulting partial ester had a hydroxyl group functionality of 1.6. The above-mentioned triol can be produced by the method disclosed in U.S. Patent 2,769,843.

The partial ester was then reacted with bis(2-isocyanatoethyl) fumarate by a procedure analogous to that described in Example 1, above. The reaction product was then diluted with mineral spirits and .02 percent cobalt, .02 percent manganese and 0.1 percent lead (percentage of metals based on weight of non-volatiles) were added.

Coatings on steel substrate were prepared and representative properties were determined in order to compare the above-described oil-modified urethane system with a commercial oil-modified urethane coating based upon tolylene diisocyanate (i.e., analogous to Example 1–A, above).

| Property | Example 2 | Commercial Product |
|---|---|---|
| Set to touch, minutes | 15 | 20 |
| Cotton free, minutes | 25 | 40 |
| Paper free, minutes | 50 | 70 |
| Sward hardness | 36 | 30 |
| $H_2O$ resistance | Good | Good |
| 2% aqueous NaOH resistance | Good | Fair |
| 1% aqueous $H_2SO_4$ | Good | Good |
| Impact Strength, inch-lbs | Over 108 | 100 |

The chemical resistance tests were conducted as follows:

The coated substrate was partially immersed in a beaker of the reagent for a period of 4 hours at room temperature (about 23° C.). If there was no noticeable effect on the film after this time, the resistance is rated as "excellent." If there is only a line at the air-liquid interface, the resistance of the film is rated "good." If the film has been noticeably attacked, but is still intact, the resistance is "fair," and if the film has started to disintegrate, the resistance is poor.

It is noted that the coating of Example 2 had better NaOH resistance and hardness than the commercial product, and at the same time had better impact resistance. This is indeed surprising since the usual case is that improved chemical resistance and hardness in a coating is obtained concurrently with a reduction in impact strength.

What is claimed is:
1. A coating composition that consists essentially of the urethane-containing reaction product of:
    (a) a bis(2-isocyanatoethyl) fumarate selected from the group consisting of bis(2-isocyanatoethyl) fumarate, bis(1 - methyl-2-isocyanatoethyl) fumarate, and 1-methyl-2-isocyanatoethyl 2 - isocyanatoethyl fumarate, and
    (b) a partial ester of (1) an aliphatic alcohol that has at least 3 hydroxyl groups and (2) drying oil acid, the said partial ester having an average alcoholic hydroxyl functionality greater than 1, wherein the reactants (a) and (b) are reacted in proportions such that there is about one equivalent of isocyanato per equivalent of hydroxyl.
2. The composition of claim 1 wherein the said aliphatic alcohol is glycerol.
3. The composition of claim 1 wherein said aliphatic alcohol is 4,8,9 - trihydroxytricyclo[$4.3.1^{2,5}.0^{1,6}$]decane.

References Cited
UNITED STATES PATENTS

| | | | |
|---|---|---|---|
| 3,022,327 | 2/1962 | Waythomas | 260—18 |
| 3,210,302 | 10/1965 | Bowell et al. | 260—18 |
| 3,256,220 | 6/1966 | Brotherton et al. | 260—18 |
| 3,275,679 | 9/1966 | Brotherton et al. | 260—77.5 |
| 3,281,378 | 10/1966 | Garber et al. | 260—77.5 |

DONALD E. CZAJA, *Primary Examiner.*

C. W. IVY, *Assistant Examiner.*